Feb. 10, 1948.    P. H. WILKINSON    2,435,704
TOASTER
Filed June 1, 1945
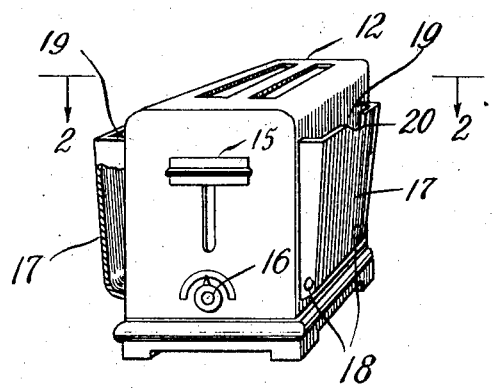
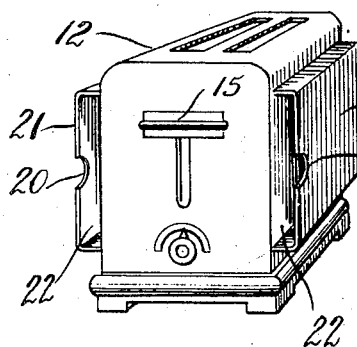
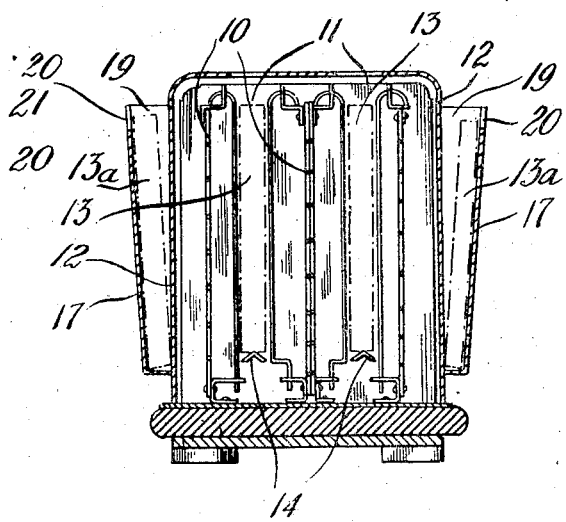
INVENTOR.
PAUL H. WILKINSON
BY
ATTORNEY Patented Feb. 10, 1948

2,435,704

UNITED STATES PATENT OFFICE 2,435,704

TOASTER

Paul H. Wilkinson, Flushing, N. Y.

Application June 1, 1945, Serial No. 597,011

3 Claims. (Cl. 99—339)

My present invention is directed to improved electrical toasters.

An object of the invention is to provide a heated enclosure for slices of bread or the like which have been previously toasted, and to utilize the heat engendered in the toasting operation for such purpose. Pursuant to the invention the toaster is provided with pockets which may be formed of any suitable material, and arranged exteriorly of and in juxtaposition with the toaster casing.

Such pockets are preferably closed on all sides except one, which open side may be either the upper side of the pocket or a lateral side, desirably the front lateral side.

Further features and objects of the invention will be more fully understood from the following detailed description and accompanying drawings, in which:

Fig. 1 is an elevational perspective view of a preferred embodiment of the invention.

Fig. 2 is a central sectional view on line 2—2 of Fig. 1.

Fig. 3 is an elevational perspective view of another embodiment of the invention.

Referring to the preferred embodiment illustrated in Figs. 1 and 2, the electrical toaster may comprise a conventional type of toaster embodying the usual sets, say two, of heater units 10, 10 corresponding to the number of compartments 11, housed in a conventional metal casing 12. Slices 13 of bread or the like are indicated as placed in the compartments 11. Such toaster is shown comprising the conventional type of carriage indicated at 14 for supporting such slices 13, and provided with a handle 15 for depressing such carriage and for initiating the closing of the electrical circuit through the sets of heater units. A timing and/or temperature regulator may also be provided having the setting and indicating finger piece 16.

Pursuant to the invention one or more pockets 17, two being shown in Figs. 1 and 2, are secured to the outer faces of the sides of the metal casing 12, for the purpose of containing a corresponding number of toasted slices, indicated at 13a.

Such pockets as shown in Figs. 1 and 2 are each provided with access openings 19 at the top. An indenture indicated at 20 may be provided in each pocket to aid in grasping the slice.

Preferably such pockets are each provided with openings 18, two being shown for each pocket, located closely to the bottom of the pocket for the purpose of introducing a small brush therethrough and for the discharge of crumbs or other foreign matter.

The embodiment shown in Fig. 3 conforms generally to that illustrated in Figs. 1 and 2; the corresponding parts are indicated by corresponding reference characters. The feature of the embodiment shown in Fig. 3 resides in the pockets 21 having their access openings 22, 22, laterally of the pockets. Such form of laterally open pocket affords facility for brushing out of crumbs and other foreign matter by means of a brush operated through the opening of such pocket.

The operation of the stated embodiment of the invention will be largely understood from the foregoing description and the accompanying drawings, with the notation that in the course of toasting, the casing as well as the internal parts of the electrical toaster, per se, are heated, whereby the walls of the pockets are also heated, thus maintaining heated enclosures for the toasted slices.

The pocket may be made of any suitable material, and secured to the casing by procedure and/or means appropriate to the material of the pocket. In the instance of use of metal as the material for the pocket, and assuming the casing to be also of metal, the pocket may be secured by welding such as spot welding, and desirably by seam welding.

Glass may serve as the material of the pocket, in which instance, assuming the casing to be of metal, the casing could be blanked and formed to provide outwardly extending projections such as one or more lugs located horizontally to engage the bottom or lower side of the pocket, and lugs engaging and retaining the other two closed sides of the pocket. In such provision of support of such glass pocket by the metal casing, the openings of the material of the casing resulting from such blanking and forming, are disposed within the zone of the interior of the pocket and afford passage into the pocket of radiant heat and the flow of convection heating air currents engendered by the heating means.

In the instance of the use of glass for the pocket, the casing may be formed with protruding portions serving to support the pocket at its bottom or lower side and at its other closed sides.

Plastics, particularly thermosetting plastics, possessing suitable physical characteristics, may serve as the material of the pocket; such pocket may be secured to the casing pursuant to suitable procedure, such as above set out with respect to a pocket of glass.

From the foregoing, it is apparent that the invention affords enhancement of artistic appearance of a toaster, in that the material selected for the pocket may possess color and/or sheen or be colored and/or sheened differentially with respect to the casing.

The invention affords also the dehydration of slices of fresh bread for the purposes of preparing croutons, Melba toast, and the like.

The embodiments hereinabove specifically described and illustrated in the drawings, are designed with reference to electrical types of toasters, and it will be apparent that my invention may also be applied to other types of toasters such as gas-heated types, and also to electrical and gas-heated types embodying an endless chain or equivalent carrier for conveying the slices through the toaster.

As indicated in the drawings, each pocket of the respective embodiments of the invention is dimensioned to substantially wholly enclose a slice; if desired each pocket may be dimensioned to accommodate any desired number of slices or slices of any given size or sizes.

From the above, it appears that the invention comprises in combination with a toaster for toasting slices of bread or the like, equipped with suitable heating means and carrier means for receiving and holding such slices in heat exchange relation with such heating means, the toaster further comprising a casing enclosing such heating means and such carrier means, the casing including a flat side and a pocket dimensioned to receive substantially the whole of a slice, such pocket being directly secured to such flat side of the casing whereby the inserted slice is in heat exchange relation with such flat side of the casing, the pocket being dimenisoned to be bounded within the contour of such flat side.

I claim:

1. An electric toaster comprising, in combination, a base for supporting the toaster on a table or the like, a pair of bread toasting compartments supported on said base and including two pairs of spaced toasting elements, each pair defining a toasting compartment, a casing mounted on said base and surrounding said compartments, said casing including a pair of side walls respectively adjacent and parallel to two toasting elements so as to be in heat transfer relation thereto, a platform secured to and extending horizontally outwardly from each of said side walls, and side and end wall members secured to and extending upwardly from each of said platforms to form therewith and with the adjacent casing side wall a storage compartment for receiving and storing a piece of toast in close adjacency to said casing side wall so that the warmth of the piece of toast will be maintained by the heat transmitted to its compartment by said casing side wall.

2. An electric toaster in accordance with claim 1, wherein each of said storage compartments has a horizontal access opening at its top.

3. An electric toaster in accordance with claim 1, wherein each of said storage compartments has a vertical access opening at one end thereof.

PAUL H. WILKINSON.

REFERENCES CITED

The following references are of record in the file of this patent:

UNITED STATES PATENTS

| Number | Name | Date |
|---|---|---|
| 374,909 | Hopper | Dec. 13, 1887 |
| 1,473,213 | De Matteis | Nov. 6, 1923 |
| 1,717,926 | Horowitz | June 18, 1929 |
| 1,932,125 | Woodward | Oct. 24, 1933 |
| 1,946,886 | Schramm | Feb. 13, 1934 |
| 2,113,697 | Lang | Apr. 12, 1938 |
| 2,244,619 | Heise et al. | June 3, 1941 |
| 2,262,910 | Aller | Nov. 18, 1941 |
| 2,368,440 | Barker | Jan. 30, 1945 |